UNITED STATES PATENT OFFICE.

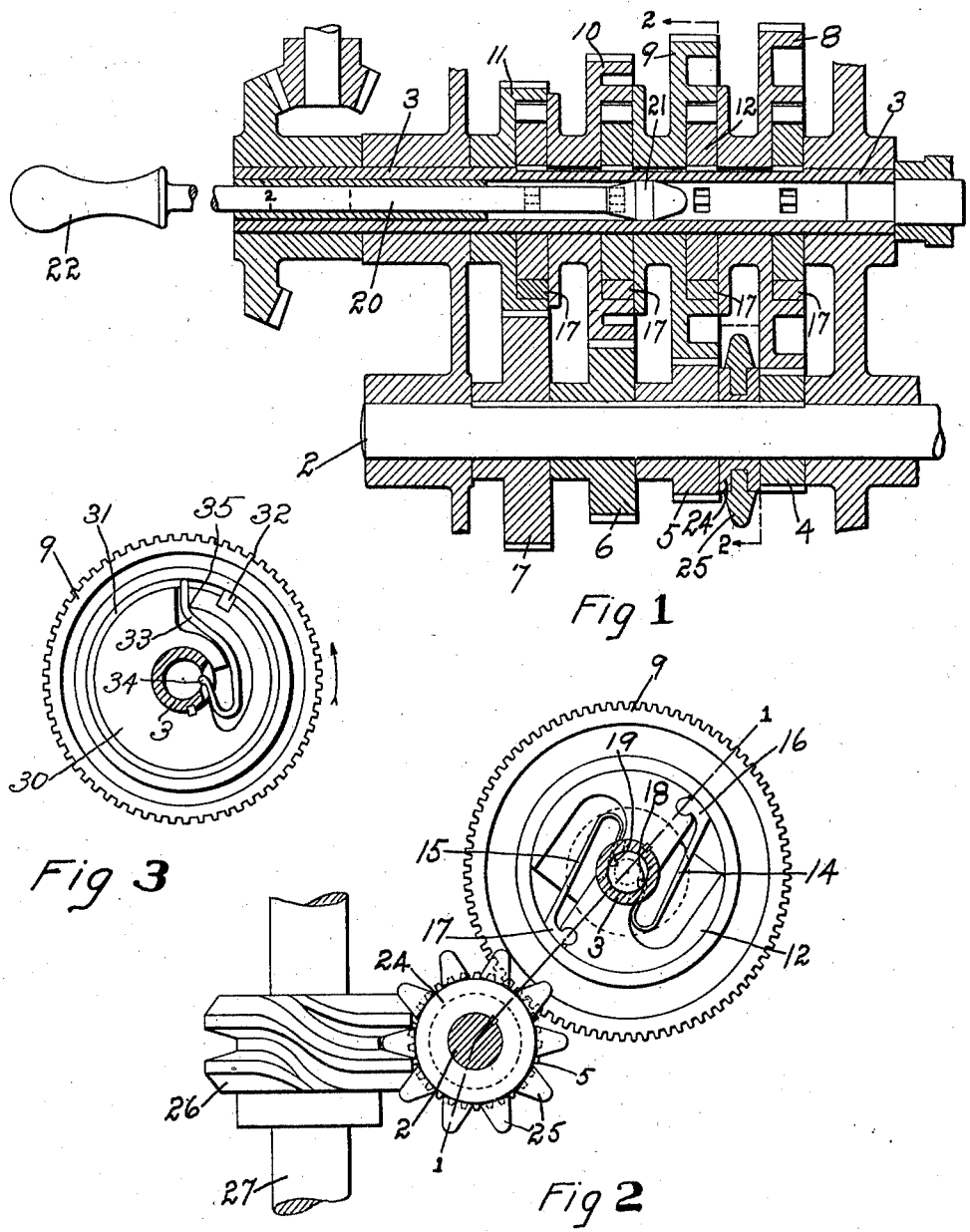

CHARLES C. BLAKE, OF BROOKLINE, MASSACHUSETTS.

SPEED-CHANGING MECHANISM.

1,399,737.  Specification of Letters Patent.  Patented Dec. 13, 1921.

Application filed September 1, 1917. Serial No. 189,354.

*To all whom it may concern;*

Be it known that I, CHARLES C. BLAKE, a citizen of the United States, residing at Brookline, in the county of Norfolk and State of Massachusetts, have invented certain Improvements in Speed-Changing Mechanism, of which the following description, in connection with the accompanying drawings, is a specification, like reference characters on the drawings indicating like parts in the several figures.

This invention relates to mechanisms for controlling the connection between a shaft and one or more members arranged to be driven by said shaft or to be utilized to drive the shaft, and will be herein disclosed as embodied in a novel form of speed changing mechanism.

It is the chief object of the invention to devise a mechanism of the character above indicated which will be simple and compact in construction, can be economically manufactured, will be reliable in operation, and will not be subject to rapid wear or deterioration. To these ends the invention involves certain novel combinations and arrangements of parts and details of construction which will be fully described hereinafter and the novel features of which will be pointed out in the appended claims.

Referring now to the accompanying drawing:

Figure 1 is a longitudinal, cross sectional view of a speed changing mechanism embodying the invention in the form now preferred, the section being taken substantially on the line 1—1, Fig. 2;

Fig. 2 is a transverse, cross sectional view of the mechanism shown in Fig. 1; and Fig. 3 is a side elevation of a modified form of clutch which may be used in the mechanism.

The mechanism shown comprises a driving shaft 2 and a hollow driven shaft 3, although, if desired, the shaft 3 could be utilized as the driving shaft and the shaft 2 as the driven shaft. These two shafts are supported in suitable bearings in parallel relationship. Four gears, indicated respectively, at 4, 5, 6 and 7, Fig. 1, are mounted fast on the shaft 2 and run constantly in mesh with other gears indicated, respectively, at 8, 9, 10 and 11, all loosely mounted on the hollow shaft 3. The gears are arranged in pairs, as shown, so that each gear on the shaft 2 drives a gear on the shaft 3, and the pairs of gears are made of different gear ratios so that if the shaft 2 is driven at a constant speed, the shaft 3 may be driven therefrom at any one of four different speeds depending upon which pair of gears are rendered operative to transmit motion from one shaft to the other.

Each of the gears 8, 9, 10 and 11 is equipped with a clutch by means of which any one of them may be utilized to drive the shaft 3. Since the clutches are all alike, a description of one only is necessary. As best shown in Fig. 2, each clutch includes a hub member 12 keyed to the shaft 3 and mounted within a recess formed in its respective gear. Two spring arms indicated at 14 and 15, respectively, are pivotally mounted on the hub 12 at points close to the periphery of the hub and they are provided wih friction shoes indicated, respectively, at 16 and 17, located close to their pivotal points and shaped to engage the cylindrical friction surface of the gear that encircles the hub 12. The arms 14 and 15 are hook shaped, as clearly shown in Fig. 2, and their free end portions extend through slots formed in the shaft 3 and terminate in knobs 18 and 19 that project into the bore of the shaft 3 close to the axis of rotation of the shaft. By referring to Fig. 2 it will be seen that normally the gear 9 can rotate freely about the clutch hub 12 without effecting a rotative movement of the hub, but, if the ends 18 and 19 of the spring arms 14 and 15 are forced outwardly away from each other, they will apply sufficient pressure to the friction shoes 16 and 17 to crowd them hard against the peripheral wall of the recess formed in the gear 9 and establish a driving engagement between this gear and the clutch hub 12, thus transmitting the rotative movement of the gear to the hollow shaft 3.

In order to render any one of the four gears shown effective to drive the shaft 3, a clutch actuator is provided which consists of a plunger 20 having a head 21 which is mounted to slide in the bore of the shaft 3. A handle 22 is fixed to the outer end of the plunger and enables the operator or workman to adjust the plunger head longitudinally of the shaft 3 to operate any one of the clutches with which the four gears 8, 9, 10 and 11 are equipped. The plunger may be graduated as shown to aid the workman in setting it properly.

It will be evident from an inspection of Fig. 1 that when the plunger is pushed inwardly to its farthest position the gear 8 would be rendered effective to drive the shaft 3. This is the largest of the four gears shown and drives the shaft at its slowest speed. As the plunger is moved outwardly, it is brought successively into engagement with the clutches of the gears 9, 10 and 11 and since each of these gears is smaller than the preceding one, the speed of rotation of the shaft will be increased by the movement of the plunger outwardly into coöperative relationship to said clutches.

Obviously the shaft 2 may be driven from any convenient source of power and the shaft 3 may be connected to any machine or apparatus which it is desired to drive. In the construction shown the shaft 2 is given an intermittent or step by step rotative movement. For this purpose a wheel 24 is fixed to the shaft 2 and is provided with a series of radial pins or rolls 25 arranged to run in the path of a cam 26 mounted fast on an upright rotary shaft 27. The cam 26 is provided both with holding and driving portions so that this mechanism transforms a constant rotative movement of the shaft 27 into an intermittent rotative movement of the shaft 2; and the several pairs of gears between the shafts 2 and 3 may be utilized to transform this intermittent movement into an intermittent movement of the shaft 3 of a greater or less extent depending upon the ratio of the pair of gears utilized to transmit motion from one shaft to the other.

Fig. 3 shows a clutch construction which may be used instead of that shown in Figs. 1 and 2. In the arrangement shown in Fig. 3 a hub member, indicated at 30, is keyed to the shaft 3 and corresponds to the hub member 12 of the arrangement shown in Figs. 1 and 2. Between the periphery of the part 30 and the circumferential wall of the recess in the gear 9 in which the hub 30 is located there is mounted a split spring ring 31. This spring ring tends to contract and grip the peripheral edge of the hub 30 and when in this contracted condition a clearance of a few thousandths of an inch is provided between the ring and the gear, so that the gear can rotate freely with reference to the hub and ring. One end of this ring 31 abuts against a stop 32 fixed in the hub 30 and its other end bears against the end of a hook shaped spring arm 33 which is located in a recess formed for it in the hub member. The inner end of this arm terminates in a knob 34 that projects through a slot in the shaft 3 into the same relative position that the knobs 18 and 19 of the levers 14 and 15 bear with reference to the shaft 3 in the construction shown in Fig. 2.

This knob is arranged to be moved in the same way that the parts 18 and 19 are actuated in the construction of Fig. 2. That is, the head 21 of the plunger 20 is moved longitudinally of the bore of the shaft 3 into engagement with the knob 34 thus pushing it outwardly, and this movement swings the arm 33 about the corner 35 as a fulcrum point and in a counter clockwise direction, thus causing the end of the arm 33 which bears against the end of the ring 31 to expand the ring and establish a firm frictional engagement between the gear 9 and the hub 30. This construction provides a very large frictional surface through which engagement with the driving member is established and a very compact clutch thus is enabled to transmit a relatively large amount of power. When the head 21 of the plunger is moved out of engagement with the knob 34, the ring 31 contracts and breaks its engagement with the gear 9, returning the lever 33 to its former position.

Preferably the parts are driven in a counter clockwise direction, as indicated by the arrow in Fig. 3, since a firmer frictional engagement between the ring 31 and the gear 9 is produced with this arrangement. If it were desired to drive the parts in the opposite direction it would be preferable to laterally reverse the arrangement of parts shown in order that the driving member would run against the free end of the contracting ring.

The mechanism provided by this invention is exceedingly simple and compact in construction, is easy to adjust and is very reliable in operation. Furthermore it is not subject to rapid wear or deterioration. While the invention has been above described as embodied in a novel form of speed changing mechanism, it is obvious that many features of the invention are applicable to other uses where it is desired to control the connection between a shaft and one or more members arranged to drive or to be driven by the shaft. The invention therefore is limited neither to the particular application herein disclosed nor to the details of construction shown and described, but may be embodied in other forms varying with the application made of the invention and the requirements under which it is used.

What is claimed as new is:

1. In a mechanism of the character described, the combination of a hollow shaft, a member rotatably mounted on said shaft and a clutch for connecting said member to said shaft and disconnecting it therefrom comprising a hub fast on said shaft, said hub being closely encircled by said member, a hook shaped spring lever supported on said hub and having a part extending into a position adjacent to the axis of said shaft and a device movable in the bore of said shaft and arranged to move said lever to operate the clutch.

2. A mechanism of the character described, having, in combination, a hollow shaft, a clutch hub mounted on said shaft a split spring ring substantially encircling said hub and tending to contract, means for limiting the movement of one end of said ring toward the other, a hook shaped spring lever having one end in engagement with the opposite end of said split ring and its other end projecting into the bore of said shaft, said hub having a part constituting a fulcrum for said lever, a member freely rotatable on said shaft and encircling said hub and said split ring, and a plunger movable through said shaft and arranged to swing said lever on its fulcrum to cause it to expand said split ring and thereby effect a driving engagement between said hub and said rotatable member.

In testimony whereof I have signed my name to this specification.

CHARLES C. BLAKE.